US012803959B2

(12) United States Patent
Zhu

(10) Patent No.: US 12,803,959 B2
(45) Date of Patent: Nov. 17, 2026

(54) METHOD, EQUIPMENT, ELECTRONIC APPARATUS, STORAGE MEDIUM FOR COMMUNICATING DATA ACROSS MULTI-CLOUD PLATFORMS

(71) Applicant: New H3C Technologies Co., Ltd., Hangzhou (CN)

(72) Inventor: Guobiao Zhu, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 14 days.

(21) Appl. No.: 18/940,663

(22) Filed: Nov. 7, 2024

(65) Prior Publication Data

US 2025/0202866 A1 Jun. 19, 2025

(30) Foreign Application Priority Data

Dec. 13, 2023 (CN) ......................... 202311715672.6

(51) Int. Cl.
*H04L 9/40* (2022.01)

(52) U.S. Cl.
CPC ................................ *H04L 63/0272* (2013.01)

(58) Field of Classification Search
CPC ............... H04L 63/0272; H04L 41/022; H04L 41/0266; H04L 41/0894; H04L 41/0876; H04L 41/0895; H04L 41/40; H04L 41/0806
See application file for complete search history.

(56) References Cited

U.S. PATENT DOCUMENTS

| | | | | |
|---|---|---|---|---|
| 10,382,563 | B2 | 8/2019 | Benantar et al. | |
| 10,530,867 | B2 | 1/2020 | He et al. | |
| 2010/0042720 | A1 * | 2/2010 | Stienhans | G06F 9/5072 709/226 |

(Continued)

FOREIGN PATENT DOCUMENTS

| | | |
|---|---|---|
| CN | 116136801 | 5/2023 |
| EP | 3485610 | 6/2020 |

OTHER PUBLICATIONS

Extended European Search Report issued in corresponding European Application No. 24211391.8, dated Apr. 8, 2025.

(Continued)

*Primary Examiner* — Hany S. Gadalla
(74) *Attorney, Agent, or Firm* — NORTON ROSE FULBRIGHT US LLP

(57) ABSTRACT

Disclosed in the present disclosure are a method, an equipment, an electronic apparatus, and a storage medium for data intercommunication across multi-cloud platforms. With the technical solutions of this disclosure, mapping relationships between the configuration formats of different cloud platforms and the initial configuration format used by business personnel may be pre-stored in the multi-cloud management platform. This allows business personnel to convert sets of configuration instructions from the initial configuration format into formats recognizable by respective cloud platforms, based on these mapping relationships, in response to a determination of generating sets of configuration instructions for data intercommunication among multiple hybrid clouds on the multi-cloud management platform. Thus, the task of configuring data intercommunication across multi-cloud platforms may be completed.

14 Claims, 4 Drawing Sheets

(56) References Cited

U.S. PATENT DOCUMENTS

| | | | | |
|---|---|---|---|---|
| 2018/0255142 | A1 | 9/2018 | Benantar et al. | |
| 2020/0065129 | A1* | 2/2020 | Yoshida | G06F 9/45558 |
| 2020/0267051 | A1* | 8/2020 | Ranjbar | H04L 41/0663 |
| 2021/0058290 | A1* | 2/2021 | Ritchie | H04L 41/0869 |
| 2023/0179495 | A1* | 6/2023 | Cherkas | H04L 41/5009 715/744 |

OTHER PUBLICATIONS

Office Action issued in corresponding Chinese Application No. 202311715672.6, dated Jun. 29, 2026 (English Translation provided).

* cited by examiner

METHOD, EQUIPMENT, ELECTRONIC APPARATUS, STORAGE MEDIUM FOR COMMUNICATING DATA ACROSS MULTI-CLOUD PLATFORMS

CROSS-REFERENCE TO RELATED APPLICATION

The present application claims priority to a Chinese patent application No. 202311715672.6 filed Dec. 13, 2023, which is incorporated herein by reference in its entirety.

TECHNICAL FIELD

The present disclosure relates to data processing technology, and to a method, an equipment, an electronic apparatus, and a storage medium for communicating data across multi-cloud platforms.

BACKGROUND

With the evolution of the private clouds and the rise of the public clouds, demands for Information Technology (IT) technology in various business platforms has become diverse. Obtaining more data resources from various cloud platforms to meet different business requirements is in emergent need.

In related arts, to achieve intercommunication within a hybrid cloud network, business platforms may require personnel familiar with multi-cloud platforms and network configuration models to configure and manage both the private and the public cloud platforms. This method, which requires completing the settings and protocol configurations for the private clouds and the public clouds one by one to achieve the intercommunication within the hybrid cloud network, consumes a significant amount of time and efforts from business personnel, impacting the efficiency of business processing on the platforms.

SUMMARY

The example of this disclosure provides a method, an equipment, an electronic apparatus, and a storage medium for communicating data across multi-cloud platforms, to address issues in related arts wherein business personnel need to configure and manage the private cloud and the public cloud platforms by manual operation to achieve hybrid cloud network intercommunication, affecting business progress.

In some examples for this disclosure, a method for communicating data across multi-cloud platforms is provided, which is applied to a multi-cloud management platform connected to one or more private clouds and one or more public clouds. The method includes: receiving a first set of initial configuration instructions issued by a configuration user to the private cloud, and a second set of initial configuration instructions issued to the public cloud, wherein, the first set of initial configuration instructions and the second set of initial configuration instructions are to enable a first data communication across the one or more private clouds and the one or more public clouds, and are compiled based on an initial configuration format supported by the multi-cloud management platform; converting the first set of initial configuration instructions into a first set of configuration instructions with a first configuration format, and the second set of initial configuration instructions into a second set of configuration instructions with a second configuration format, based on a preset conversion policy; wherein the first configuration format is supported by the one or more private clouds and the second configuration format is supported by the one or more public clouds; issuing the first set of configuration instructions to the one or more private clouds; and issuing the second set of configuration instructions to the one or more public clouds.

In some examples, based on the above method of this disclosure, the block of receiving the first set of initial configuration instructions issued by the configuration user to the private cloud includes: receiving the first set of initial configuration instructions issued by the configuration user, the first set of initial configuration instruction being used to instruct the one or more private clouds to configure a first set of network parameters and establish a communication channel; wherein the communication channel is an encrypted channel for the first data communication across the one or more private clouds and the one or more public clouds; The block of receiving the second set of initial configuration instructions issued by the configuration user to the public cloud includes: receiving the second set of initial configuration instructions issued by the configuration user, the second set of initial configuration instructions being used for the one or more public clouds to configure a second set of network parameters and connect to the communication channel.

In some examples, based on the above method of this disclosure, the first set of initial configuration instructions includes: address parameters and encryption policy parameters of first intercommunication nodes, and subnet information and routing information used for routing data packet flows among the first intercommunication nodes, wherein the first intercommunication nodes locate in the one or more private clouds and perform the first data communication with the public cloud; and, a first set of channel parameters used for instructing a first channel node to establish the communication channel, wherein the first channel node is a firewall, a router, or a Virtual Private Network (VPN) gateway in the private cloud.

In some examples, based on the above method of this disclosure, the second set of initial configuration instructions includes: subnet information and routing information used for routing data packet flows among second intercommunication nodes, wherein the second intercommunication nodes locate in the public cloud and perform a second data communication with the one or more private clouds; and, a second set of channel parameters for instructing the one or more public clouds to establish a second channel node, wherein the second channel node is an encrypted protocol Internet Protocol Security Virtual Private Network (IPsec VPN) gateway.

In some examples, in another example based on the above method of this disclosure, the block of converting the first set of initial configuration instructions into the first set of configuration instructions with the first configuration format, and the second set of initial configuration instructions into the second set of configuration instructions with the second configuration format based on a preset conversion policy includes: determining the first configuration format supported by the private cloud and the second configuration format supported by the one or more public clouds based on a pre-transmitted registration information across the one or more private clouds and the one or more public clouds; converting the first set of initial configuration instructions compiled in the initial configuration format into the first set of configuration instructions compiled in the first configuration format, based on using a first format mapping relationship recorded in the preset conversion policy between the initial configuration format and the first configuration format; and converting the second set of initial configuration instructions complied in the initial configuration format into the second set of configuration instructions compiled in the second configuration format, based on a second format mapping relationship recorded in the preset conversion policy between the initial configuration format and the second configuration format.

Based on the above method of this disclosure, some examples further include: obtaining first initial node names corresponding to the first intercommunication nodes and comprised in the first set of initial configuration instructions; and obtaining second initial node names corresponding to the second intercommunication nodes and comprised in the second set of initial configuration instructions; wherein the first intercommunication nodes locate in the one or more private clouds and perform the first data communication with the public cloud, and the second intercommunication nodes locate in the one or more public clouds and perform the second data communication with the one or more private clouds; converting the first initial node names into first node names recognizable for the private cloud, and converting the second initial node names into second node names recognizable for the public cloud, based on the preset conversion policy.

In some examples, based on the above method of this disclosure, the block of issuing the first set of configuration instructions to the one or more private clouds and the second set of configuration instructions to the one or more public clouds includes: issuing the first set of configuration instructions to a Software-Defined Network (SDN) controller in the one or more private clouds; and issuing the second set of configuration instructions to cloud computing platform service in the one or more public clouds.

In another example based on the above method of this disclosure, prior to receiving the sets of initial configuration instructions issued by the configuration user, the method further includes: receiving first registration information transmitted by the one or more private clouds, wherein the first registration information comprises the first configuration format supported by the one or more private clouds and address information of the SDN controller; receiving second registration information transmitted by the one or more public clouds, wherein the second registration information comprises the second configuration format supported by the one or more public clouds and credential information for the cloud computing platform service.

In another example for this disclosure, an equipment for communicating data across multi-cloud platforms is provided, which is applied to the multi-cloud management platform connected to one or more private clouds and one or more public clouds. The equipment includes: a receiving module, to receive a first set of initial configuration instructions issued by the configuration user to the private cloud, and a second set of initial configuration instructions issued to the public cloud, where these instructions are used for enabling data communication across the private and public clouds, and are compiled based on the initial configuration format supported by the multi-cloud management platform; a conversion module, to convert the first set of initial configuration instructions into a first set of configuration instructions with a first configuration format, and convert the second set of initial configuration instruction into a second set of configuration instruction with a second configuration format by using a preset conversion policy, where the first configuration format is supported by the private cloud and the second configuration format is supported by the public cloud; as issuing module, to issue the first set of configuration instructions to the private cloud; and issue the second set of configuration instructions to the public cloud.

In another aspect of the example for this disclosure, an electronic apparatus is provided, which includes: a memory, storing executable instructions; a processor for executing the executable instructions with the memory to perform operations of the method for communicating data across multi-cloud platforms.

According to yet another example for this disclosure, a computer-readable storage medium is provided for storing computer-readable instructions, which in response to a determination of being executed, perform the operations of any of the above-mentioned methods for communicating data across multi-cloud platforms.

In this disclosure, the first set of initial configuration instructions issued by the configuration user to the private cloud and the second set of initial configuration instructions issued to the public cloud are received, wherein the first set of initial configuration instructions and the second set of initial configuration instructions are to enable data communication across the private cloud and the public cloud and are arranged based on an initial configuration format supported by the multi-cloud management platform; a preset conversion policy is utilized to convert the first set of initial configuration instructions into the first set of configuration instructions with the first configuration format supported by the private cloud and the second set of initial configuration instructions into a second set of configuration instructions with a second configuration format supported by the public cloud; the first set of configuration instructions is issued to the private cloud and the second set of configuration instructions is issued to the public cloud.

By applying the technical solution of this disclosure, mapping relationships between the configuration formats of different cloud platforms and the initial configuration format used by business personnel may be pre-stored in the multi-cloud management platform, so that in response to a determination that the business personnel generate configuration instructions on the multi-cloud management platform to enable data intercommunication between multiple hybrid clouds, the configuration instructions in the initial configuration format may be converted into configuration instructions in the configuration formats recognizable by the respective cloud platforms based on the mapping relationships, completing the configuration task for communicating data across multi-cloud platforms. On the one hand, the disclosure enable a unified management of various private and public cloud platforms using the multi-cloud management platform, automating the establishment of network communication between private and public clouds. On the other hand, the disclosure also solves the problem in related technologies where business progress is affected due to the need for business personnel to configure and manage private and public cloud platforms by manual operation to achieve hybrid cloud network intercommunication.

Below, the technical solutions of this disclosure are further described in detail through drawings and examples.

BRIEF DESCRIPTION OF THE DRAWINGS

To illustrate the technical solutions in the examples of the present disclosure or in the prior art, a brief introduction to the figures required for describing the examples or prior art will be provided below. The figures described below are some examples of the present disclosure.

DETAILED DESCRIPTION

Figure 1:
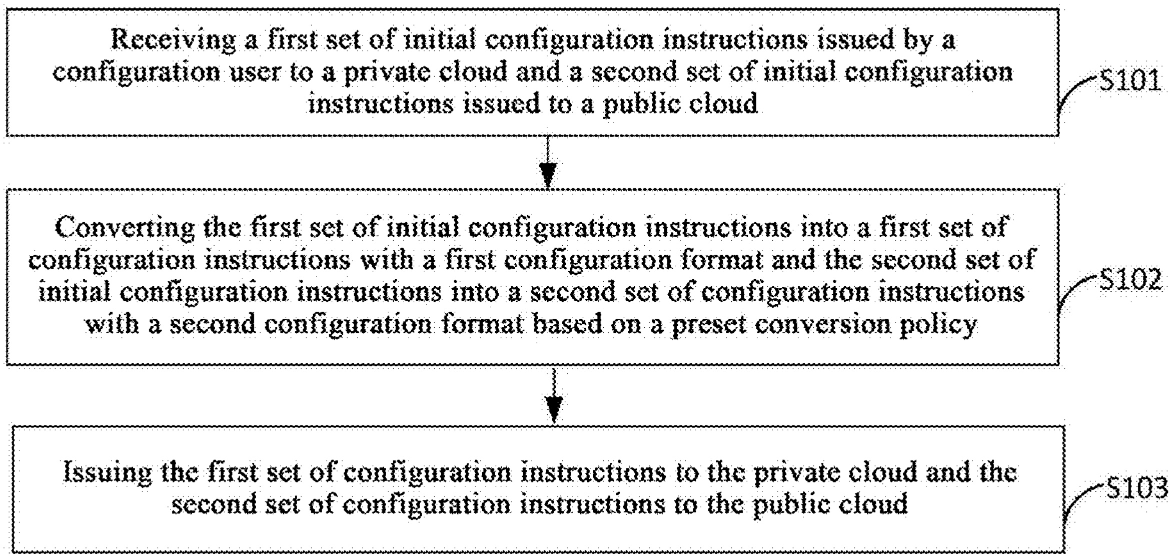
FIG. 1 is a schematic diagram of a method for communicating data across multi-cloud platforms proposed in this disclosure.

Illustrative examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example, and is not intended to be limiting of the present disclosure. The singular forms such as "a", "said", and "the" used in the present disclosure and the appended claims are further intended to include multiple, unless the context indicates otherwise. It is also to be understood that the term "and/or" as used herein refers to any or all possible combinations that include one or more associated listed items.

The present disclosure proposes a method, an equipment, an electronic apparatus, and a storage medium for communicating data across multi-cloud platforms.

In related arts, with the evolution of private clouds and the rise of public clouds, diversified demands in various business platforms for Information Technology (IT) is increasing, which requires different business data resources to meet different business needs.

Among the related arts, a hybrid cloud network architecture may meet the needs of business platforms for both public and private clouds, and establish a business network environment according to the specific business needs of the business platform.

In a possible example, a hybrid cloud network architecture is a network structure that integrates one or more public clouds and one or more private clouds, representing the main mode and development direction of cloud computing in recent years. The private clouds may be oriented towards enterprise platforms. Due to security concerns, enterprises prefer to store their data in private clouds.

However, enterprise platforms also hope to obtain the computing resources of the public clouds. In this case, the hybrid cloud network architecture is more and more adopted by enterprise platforms. The hybrid cloud network architecture may mix and match public and private clouds to achieve optimal results, providing a personalized solution that achieves both cost savings and security.

In related arts, business platforms may implement effective resource planning and allocation for both the private clouds and the public clouds within the hybrid cloud network architecture, achieving optimal configuration of business data resources and optimizing costs to a certain extent, saving investments in data resources, and offering long-term cost advantages. Furthermore, in the field of storage and processing of sensitive information of business platforms, there may be significant security risks in using public clouds for management. Business platforms may use their own private clouds for management and processing.

In summary, the hybrid cloud network architecture may enhance business flexibility, reduce costs, improve data security, and help business platforms better respond to business changes and developments, making the hybrid cloud network the preferred network architecture for an increasing number of business platforms.

However, in related arts, in response to a determination that business platforms aim to achieve intercommunication within a hybrid cloud network architecture, they may require business personnel familiar with multi-cloud platforms and network configuration models to configure and manage both the private platforms and the public cloud platforms at the same time.

However, this approach, which requires completing the settings and protocol configurations for the private clouds and the public clouds one by one to achieve the intercommunication within the hybrid cloud network, consumes a significant amount of time and efforts. The manual configuration process takes a long time, which means increased costs for enterprises.

Furthermore, the aforementioned manual configuration approach is prone to human errors. Due to differences in operating habits and experience among administrators, network configurations may be non-standard, leading to instability or security issues in the hybrid cloud network.

Based on the issues in related technologies, the present disclosure proposes a schematic diagram for a method for communicating data across multi-cloud platforms. As shown in FIG. 1, the method is applied to a multi-cloud management platform, which is connected to one or more private clouds and one or more public clouds. The method includes: S101: receiving a first set of initial configuration instructions issued by a configuration user to a private cloud and a second set of initial configuration instructions issued to a public cloud.

The first set of initial configuration instructions and the second set of initial configuration instructions are to enable data communication across the private cloud and the public cloud. The first set of initial configuration instructions and the second set of initial configuration instructions are compiled based on an initial configuration format supported by the multi-cloud management platform.

In one example, the multi-cloud management platform in this disclosure may be connected to one or more private clouds and one or more public clouds.

In one example, a public cloud refers to the public cloud services provided by cloud service providers to a large number of users. Users access the public cloud services via the Internet and may purchase cloud computing services, such as virtual servers, storage, databases, applications, etc., based on their needs and budgets. Resource allocation may be adjusted as needed, and fees are paid based on usage.

Figure 2:
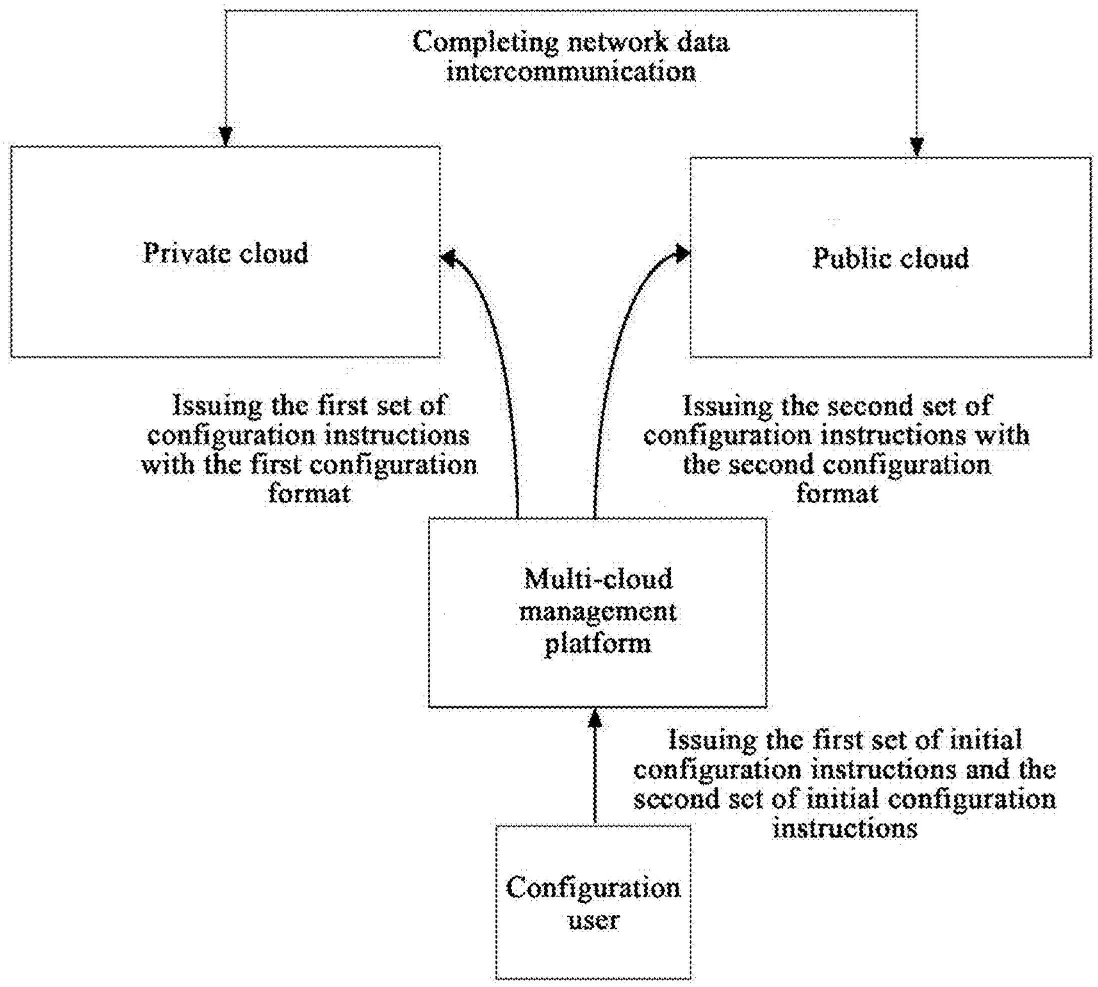
FIG. 2 is a schematic diagram of a system architecture of the multi-cloud management platform proposed in this disclosure.

In one example, as shown in FIG. 2, a system schematic diagram of the multi-cloud management platform proposed in this disclosure is provided. In this example, a format mapping relationship between the configuration formats of different cloud platforms and the initial configuration format used by business personnel may be pre-stored in the multi-cloud management platform. This allows the multi-cloud management platform to convert sets of configuration instructions in the initial configuration format, which are issued by business personnel on the multi-cloud management platform to achieve data intercommunication across multiple hybrid clouds, into the first set of configuration instructions and the second set of configuration instructions in the configuration formats that may be recognized and understood by respective cloud platform, based on the format mapping relationship. The private cloud and the public cloud complete the configuration tasks for communicating data across multi-cloud platforms based on the first set of configuration instructions and the second set of configuration instructions they receive.

S102: converting the first set of initial configuration instructions into a first set of configuration instructions with a first configuration format and the second set of initial configuration instructions into a second set of configuration instructions with a second configuration format using a preset conversion policy.

Wherein, the first configuration format is a configuration format supported by the private cloud, and the second configuration format is a configuration format supported by the public cloud.

In one example, the sets of configuration instructions issued by the configuration user may include the first set of initial configuration instructions issued to the private cloud and the second set of initial configuration instructions issued to the public cloud.

The first set of initial configuration instructions and the second set of initial configuration instructions are instructions orchestrated and generated based on a unified initial configuration format. That is, regardless of which platform the business personnel generate the corresponding set of configuration instructions on the multi-cloud management platform, the sets of configuration instructions are composed of this unified initial configuration format.

Furthermore, in order to solve the problem in related arts wherein business progress is affected because business personnel need to configure and manage the private cloud and the public cloud platforms to achieve hybrid cloud network intercommunication, this example needs to perform a configuration format conversion on the first set of initial configuration instructions and the second set of initial configuration instructions, which are composed in the initial configuration format.

In one example, the purpose of the above block is to convert the first set of initial configuration instructions into the first set of configuration instructions with the first configuration format so that the private cloud may understand and follow the instructions to configure its various network parameters for subsequent data communication with the public cloud.

In another example, this example also needs to convert the second set of initial configuration instructions into a second set of configuration instructions with the second configuration format so that the public cloud may understand and follow the instructions to configure its various network parameters for subsequent data communication with the private cloud.

The multi-cloud management platform may determine, based on registration information pre-transmitted by the private cloud, the first configuration format supported by the private cloud included in the registration information. This allows the use of a conversion policy to convert the first set of initial configuration instructions into a first set of configuration instructions with the first configuration format that may be understood by the private cloud in subsequent processes.

Furthermore, this example not only requires the conversion for the first configuration format but also the conversion for each intercommunication node indicated in the configuration information so that the private cloud may understand which intercommunication nodes need address configuration, network creation, parameter configuration, etc.

As an example, the sets of initial configuration instructions may include the need to configure Internet Protocol (IP) addresses for all site devices (i.e., first intercommunication nodes) in the private cloud. In terms of the initial configuration format, the names of these site devices may be Tenant Device 1, Tenant Device 2, and Tenant Device 3 (i.e., Router1, Router2, Router3).

In a possible example, Router1, Router2, and Router3 are the first initial node names generated by business personnel in the initial configuration format. Furthermore, in this example of the present disclosure, the multi-cloud management platform may utilize a conversion policy to convert Router1, Router2, and Router3 into first node names recognizable by the private cloud, i.e., Site Device 1, Site Device 2, and Site Device 3. This example of the present disclosure employs the aforementioned method to allow the private cloud to understand which intercommunication nodes under its network require corresponding IP address configurations.

In another possible example, the multi-cloud management platform may also determine, based on registration information pre-transmitted by the public cloud, the second configuration format supported by the public cloud included in the registration information, allowing the subsequent use of a conversion policy to convert the second set of initial configuration instructions into the second set of configuration instructions with the second configuration format that the public cloud may understand.

Furthermore, this example of the present disclosure not only requires the conversion for the second configuration format but also the conversion for each intercommunication node indicated in the configuration information, so that the public cloud may understand which intercommunication nodes require address configuration, network creation, parameter configuration, and so on.

As an example, the set of initial configuration instructions may include the need to configure routing information for all subnet nodes (i.e., second intercommunication nodes) in the public cloud. In terms of the initial configuration format, the names of these subnet nodes may be Tenant Device 4, Tenant Device 5, and Tenant Device 6 (i.e., Router4, Router5, Router6).

In one approach, Router4, Router5, and Router6 are the second initial node names generated by business personnel in the initial configuration format. Furthermore, in this example of the present disclosure, the multi-cloud management platform may utilize a conversion policy to convert Router4, Router5, and Router6 into the second node names recognizable by the public cloud, i.e., Subnet Node 1, Subnet Node 2, and Subnet Node 3. This example of the present disclosure employs the aforementioned method to allow the public cloud to understand which subnet nodes under its network require corresponding routing information configurations.

S103: issuing the first set of configuration instructions to the private cloud and the second set of configuration instructions to the public cloud.

Figure 3:
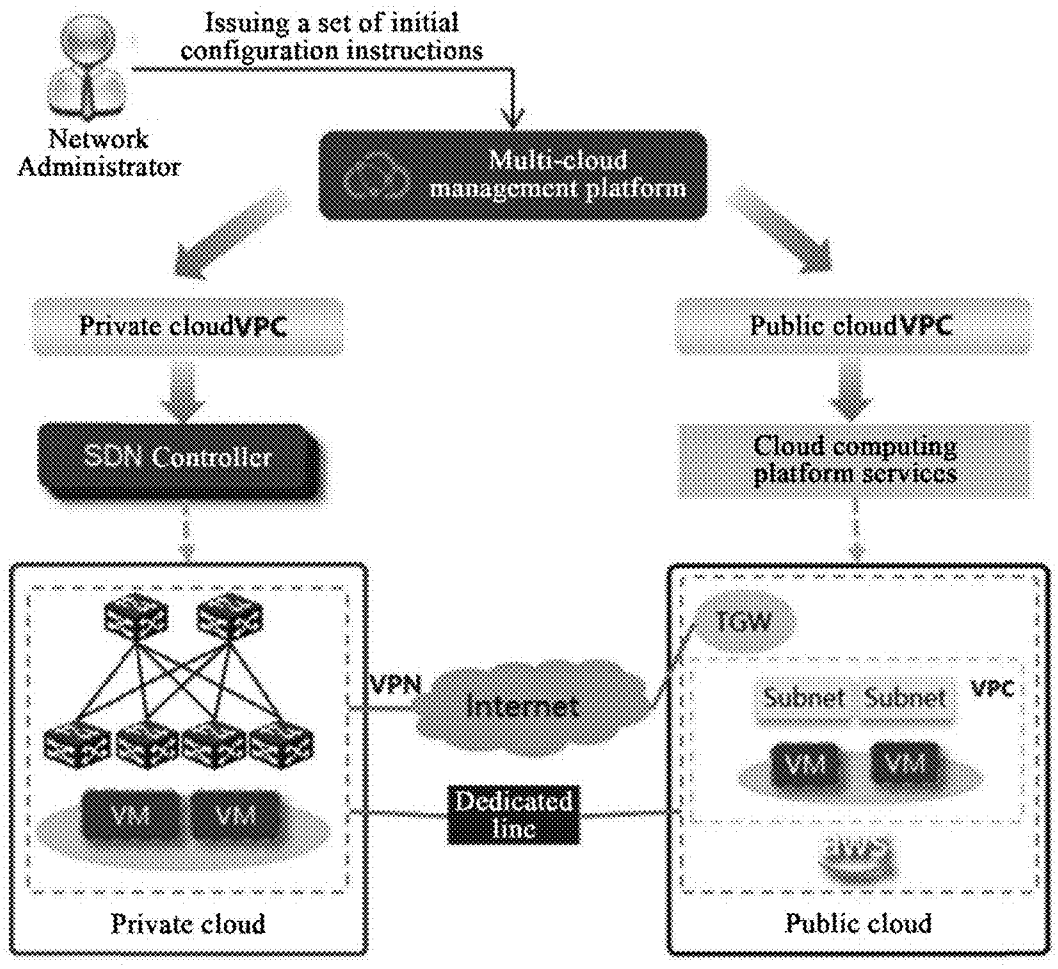
FIG. 3 is a schematic diagram of a system execution process of the multi-cloud management platform proposed in this disclosure.

In one approach, as shown in FIG. 3, it is the system execution schematic diagram of the multi-cloud management platform proposed in this disclosure. The diagram illustrates that the multi-cloud management platform in this example may manage both the SDN controller of the private cloud and the cloud computing platform service of the public cloud.

In one approach, the multi-cloud management platform may issue the first set of configuration instructions to the SDN controller through the open Application Programming Interface (API) of the SDN controller, enabling the SDN controller to forward the set of configuration instructions to the private cloud.

SDN stands for Software-Defined Networking, which is a software-based network architecture that decouples the control and data forwarding planes of the network, separating the network control plane from the data forwarding plane and managing the entire network through a centralized controller.

In another possible example, the multi-cloud management platform may issue the second set of configuration instructions to a cloud computing platform service through the open API of the cloud computing platform service, enabling the cloud computing platform service to forward the set of configuration instructions to the public cloud.

Furthermore, after the private cloud and the public cloud have completed their respective network parameter configurations, they may achieve network intercommunication across the private cloud and the public cloud through a communication channel (such as IPsec VPN or dedicated lines).

By applying the technical solution of this disclosure, mapping relationships between the configuration formats of different cloud platforms and the initial configuration format used by business personnel may be pre-stored in the multi-cloud management platform. This allows business personnel to convert sets of configuration instructions in the initial configuration format into the sets of configuration instructions in formats recognizable by respective cloud platforms based on the mapping relationships in response to a determination of generating sets of configuration instructions for data intercommunication across multiple hybrid clouds on the multi-cloud management platform. Thus, the task of configuring data intercommunication across multi-cloud platforms may be completed.

This not only enables the unified management of various private and public cloud platforms using a multi-cloud management platform, automating the network communication across private and public clouds, but also addresses the issue in related technologies where manual configuration and management of the private cloud and the public cloud platforms by operators were required to achieve hybrid cloud network intercommunication, which impacted business progress, and, avoids the drawback of slow storage system recovery times caused by such methods.

In some examples, in another example based on the above method of this disclosure, receiving sets of configuration instructions issued by the configuration user encompasses two aspects. The first aspect includes: receiving the first set of initial configuration instructions issued by the configuration user, which instructs the private cloud to configure a set of network parameters and establish a communication channel, wherein the communication channel is an encrypted channel for first data communication across the private cloud and the public cloud.

The first set of initial configuration instructions includes: address parameters and encryption policy parameters of first intercommunication nodes, as well as subnet information and routing information used to indicate data packet flows among the first intercommunication nodes. The first intercommunication nodes are nodes in the private cloud that need to communicate data with the public cloud.

In one approach, the first set of initial configuration instructions is used to configure the private cloud as follows:

For example, configuring a first channel node in the private cloud to establish the communication channel.

The first channel node may be a site device in the private cloud, such as firewalls, routers, or VPN gateways.

In some examples, the communication channel in this example of the disclosure may be an IPsec tunnel. IPsec (Internet Protocol Security) is a set of protocols and technologies used to provide security and privacy on IP networks.

In one approach, the primary objectives of IPsec are to protect the confidentiality, integrity, and availability of data communications to prevent unauthorized access, data tampering, and denial-of-service attacks. IPsec is to build virtual private networks (VPNs) to protect network communications such as remote access, site-to-site connections, and cloud services.

In one approach, during the process of creating an IPsec tunnel in the private cloud in this example of the disclosure, the IP addresses of the local and remote gateways, as well as IPsec parameters (encryption algorithm, hash algorithm, DH group, etc.), may be specified. This ensures that the configurations of the local and remote IPsec tunnels in the private cloud match parameters such as encryption parameters, and lifetimes.

As another example, the first set of initial configuration instructions may also be used to configure the address parameters and encryption policy parameters of the first intercommunication nodes in the private cloud.

The first intercommunication nodes are site devices in the private cloud that need to communicate data with the public cloud. In one approach, this example of the disclosure may configure the local subnets and remote subnets of the sites, defining which traffic needs to be transmitted through the tunnel. Furthermore, parameters such as the IP addresses, the PSKs, the encryption algorithms, the hash algorithms, and other parameters matching the public cloud IPsec gateway for each site device are configured.

In another example, based on the above method of this disclosure, receiving sets of configuration instructions issued by the configuration user encompasses a second aspect, which includes: receiving a second set of initial configuration instructions issued by the configuration user, which instructs the public cloud to configure a second set of network parameters and connect the communication channel.

The second set of initial configuration instructions includes: subnet information and routing information used to indicate data packet flows among the second interconnection nodes, wherein the second interconnection nodes are nodes in the public cloud that need to communicate data with the private cloud; as well as second set of channel parameters used to instruct the public cloud to establish second channel nodes, which are IPsec VPN gateways with encryption protocols.

In one approach, the second set of initial configuration instructions is to configure the public cloud as follows:

For example, creating an IPsec VPN gateway in the public cloud and configuring connection parameters such as pre-shared keys (PSKs) or certificates.

As another example, creating a virtual private cloud (VPC) or network in the console or command-line tool of the public cloud provider to determine the network where the cloud resources are located. In addition, creating subnets and configuring routing tables to route traffic in the public cloud to the IPsec gateway.

In one approach, the example of this disclosure requires configuring routing information on each site device or network node within a private cloud or a public cloud to ensure that tunnel traffic is routed to and from the correct VPC or subnet of the public cloud.

In response to a determination that there are multiple sites or networks, appropriate routing may also be configured to specify which site or subnet the traffic should flow to.

In some examples, in another example based on the method described above in this disclosure, converting the sets of initial configuration instructions into the first set of configuration instructions with the first configuration format and the second set of configuration instructions with the second configuration format using the preset conversion policy, includes: determining the first configuration format supported by the private cloud and the second configuration format supported by the public cloud based on registration information pre-transmitted across the private cloud and the public cloud; converting the first set of initial configuration instructions compiled in the initial configuration format into a first set of configuration instructions compiled in the first configuration format by using a first format mapping relationship recorded in the conversion policy between the initial configuration format and the first configuration format; and, converting the second set of initial configuration instructions compiled in the initial configuration format into a second set of configuration instructions compiled in the second configuration format by using a second format mapping relationship recorded in the conversion policy between the initial configuration format and the second configuration format.

In a possible example of this disclosure, an initial configuration format supported by a multi-cloud management platform needs to be first obtained. The initial configuration format is a configuration format supported by the multi-cloud management platform itself. In other words, the first set of initial configuration instructions and the second set of initial configuration instructions are also sets of configuration instructions compiled in this initial configuration format.

Furthermore, a private cloud and a public cloud also have their own supported configuration formats, i.e., the first configuration format and the second configuration format. In this example of the disclosure, the first set of initial configuration instructions compiled in the initial configuration format needs to be converted into a first set of configuration instructions that the private cloud may recognize and understand. And the second set of initial configuration instructions compiled in the initial configuration format needs to be converted into a second set of configuration instructions that the public cloud may recognize and understand.

In some examples, in another example based on the method described above in this disclosure, the method further includes: obtaining a first initial node name corresponding to a first intercommunication node included in the first set of initial configuration instructions, and obtaining a second initial node name corresponding to a second intercommunication node included in the second set of initial configuration instructions. The first intercommunication node apparatus is a node in the private cloud that needs to communicate data with the public cloud, and the second intercommunication node is a node in the public cloud that needs to communicate data with the private cloud; converting the first initial node name into a first node name recognizable by the private cloud, and the second initial node name into a second node name recognizable by the public cloud by using the conversion policy.

In one approach, the example of this disclosure not only needs to convert for the first configuration format but also needs to convert for each intercommunication node indicated in the configuration information so that the private cloud may understand which intercommunication nodes need the address configuration, the network creation, and the parameter configuration, etc.

As an example, in response to a determination that the set of initial configuration instructions includes the need to configure IP addresses for all site devices (i.e., first intercommunication nodes) in the private cloud. Then, in terms of the initial configuration format, the names of all these site devices may be Tenant Device 1, Tenant Device 2, and Tenant Device 3 (i.e., Router1, Router2, Router3).

In one approach, Router1, Router2, and Router3 are the first initial node names generated by business personnel in the initial configuration format. Furthermore, in this example of the disclosure, the multi-cloud management platform may use the conversion policy to convert Router1, Router2, and Router3 into the first node names recognizable by the private cloud, i.e., Site Device 1, Site Device 2, and Site Device 3. This example of the disclosure utilizes the above method to allow the private cloud to understand which intercommunication nodes under its network need corresponding IP address configuration.

In another approach, the example of this disclosure not only needs to convert for the second configuration format but also needs to convert for each intercommunication node indicated in the configuration information so that the public cloud may understand which intercommunication nodes need address configuration, network creation, and parameter configuration, etc.

As an example, in response to a determination that the set of initial configuration instructions includes the need to configure routing information for all subnet nodes (i.e., second intercommunication nodes) in the public cloud, then, in terms of the initial configuration format, the names of all these subnet nodes may be Tenant Device 4, Tenant Device 5, and Tenant Device 6 (i.e., Router4, Router5, Router6).

In one approach, Router4, Router5, and Router6 are the second initial node names generated by business personnel in the initial configuration format. Furthermore, in this example of the disclosure, the multi-cloud management platform may use the conversion policy to convert Router4, Router5, and Router6 into the second node names recognizable by the public cloud, i.e., Subnet Node 1, Subnet Node 2, and Subnet Node 3. This example of the disclosure utilizes the above method to allow the public cloud to understand which subnet nodes under its network need corresponding routing information configuration.

In some examples, in another example based on the method described above in this disclosure, issuing the first set of configuration instructions to the private cloud and the second set of configuration instructions to the public cloud includes: issuing the first set of configuration instructions to the SDN controller of the private cloud; and issuing the second set of configuration instructions to the cloud computing platform service of the public cloud.

In some examples, in another example based on the method described above in this disclosure, before receiving the sets of initial configuration instructions issued by the configuration user, the method further includes: receiving first registration information transmitted by the private cloud, where the first registration information includes the first configuration format supported by the private cloud and the address information of the SDN controller; and, receiving second registration information transmitted by the public cloud, where the second registration information includes the second configuration format supported by the public cloud and the credential information of the cloud computing platform service.

In one approach, the example of this disclosure allows the multi-cloud management platform to pre-connect to the private cloud SDN controller. This may be achieved by entering the IP, username, password, and other information of the private cloud SDN controller in the multi-cloud management platform to complete the controller's connection, providing a prerequisite for the multi-cloud management platform to invoke the private cloud SDN controller's RESTful API interface to distribute network configurations.

In another approach, the example of this disclosure may pre-connect the public cloud computing platform service with a multi-cloud management platform. This connection of the public cloud computing platform service may be accomplished by entering the RAM account, Access Key ID (AK)/Secret Key (SK), and other relevant information of the public cloud computing platform service into the multi-cloud management platform, providing the prerequisite for the multi-cloud management platform to invoke the cloud computing platform service open APIs to deploy network resources.

In one method, during the process of configuring data packet flows among various first intercommunication nodes in a private cloud via the multi-cloud management platform, the following blocks may be implemented: instructing that the east-west intercommunication nodes in the private cloud to transmit data to each other and that the north-south intercommunication nodes in the private cloud to access the external network via an egress gateway.

In addition, the private cloud may configure the routing tables required for intercommunication among private cloud data center sites in TnR-0 (Private Cloud Data Center Routing Table). In TR-0 (East-West Transit Routing Table), the VXLAN ID of the transit routing table and the import/export RT are configured. In TR-1 (North-South Transit Routing Table), the egress gateway apparatus of the private cloud data center is to direct traffic to the network. Furthermore, TRLink-0 (Transit Routing Connection) connects TR-0 and TR-1, and a firewall apparatus within the private cloud data center is to forward private cloud traffic through the firewall to the egress gateway, enabling network access.

In one method, during the process of configuring data packet flows among various second intercommunication nodes in a public cloud via the multi-cloud management platform, the following blocks may be implemented: instructing to compile the public cloud VPCs that need to interconnect in the cloud computing platform service in the public cloud, as well as to compile IPsec and configure tunnel information to bridge the public cloud VPC and private cloud VPC, with one-click configuration deployment to complete the network intercommunication setup.

In another approach, IPSECO in the IPSEC tunnel may connect the private cloud TRI and the cloud computing platform service-TR in the public cloud computing platform service. IPsec protocol parameters (IP version, public IP, BGP AS number, tunnel key, tunnel encryption algorithm, etc.) are configured in IPSECO. During configuration deployment, the IPsec protocol configuration is pushed down to the firewall apparatus in the private cloud data center and the transit gateway (TGW) apparatus in the public cloud computing platform service, establishing the IPsec tunnel.

Figure 4:
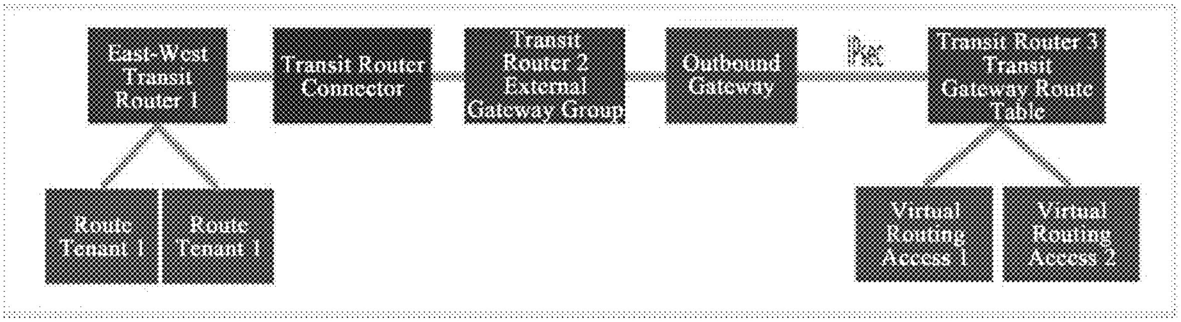
FIG. 4 is a schematic diagram of an architecture for data communication between a private cloud and a public cloud proposed in this disclosure.

In one method, as shown in FIG. 4, during the process of configuring data communication across a private cloud and a public cloud via the multi-cloud management platform, the following blocks may be implemented: configuring, by the multi-cloud management platform, the routing tables required for intercommunication among private cloud data center sites in Tenant Router1 (Private Cloud Data Center Routing Table). In Transit Router1 (East-West Transit Routing Table), the VXLAN ID of the transit routing table and the import/export RT are configured. In addition, in Transit Router2 (North-South Transit Routing Table), the egress gateway apparatus of the private cloud data center is to direct traffic to the Internet. Transit Router Connection (Transit Routing Connection) connects Transit Router1 and Transit Router2, and a firewall apparatus within the private cloud data center is to forward private cloud traffic through the firewall to the egress gateway, enabling network access.

Furthermore, the multi-cloud management platform may configure access to Internet switch apparatus information, such as public IP, in the egress gateway. Virtual Router Access 1 and Virtual Router Access 2 configure the routing tables required for intercommunication within the public cloud VPC, while Transit Router3 configures the transit routing table for the cloud computing platform service in the public cloud, where the routing tables required for intercommunication within the public cloud VPC directs to the public cloud tunnel interface.

Moreover, the multi-cloud management platform may configure IPsec protocol parameters (IP version, public IP, BGP AS number, tunnel key, tunnel encryption algorithm, etc.) in IPsec. During configuration deployment, the IPsec protocol configuration is pushed down to the firewall apparatus in the private cloud data center and the TGW apparatus in the public cloud computing platform service, establishing the IPsec tunnel.

On one hand, the tunnel interface on the public cloud side may be deployed on the TGW, with the IPsec protocol configuration being pushed down to the tunnel interface. Transit Router3 corresponds to the router table of the TGW, while Virtual Router Access 1 and Virtual Router Access 2 correspond to the router table of VPC.

On the other hand, a firewall apparatus is configured in the Transit Router connection on the private cloud side. The IPsec protocol configuration pushed down to the firewall apparatus is consistent with the IPsec configuration on the tunnel interface of the public cloud side, enabling the establishment of a VPN connection between the firewall tunnel interface of the private cloud and Transit Router3 of the public cloud. This VPN connection includes two IPsec tunnels, achieving load balancing and primary/backup switching.

Figure 5:
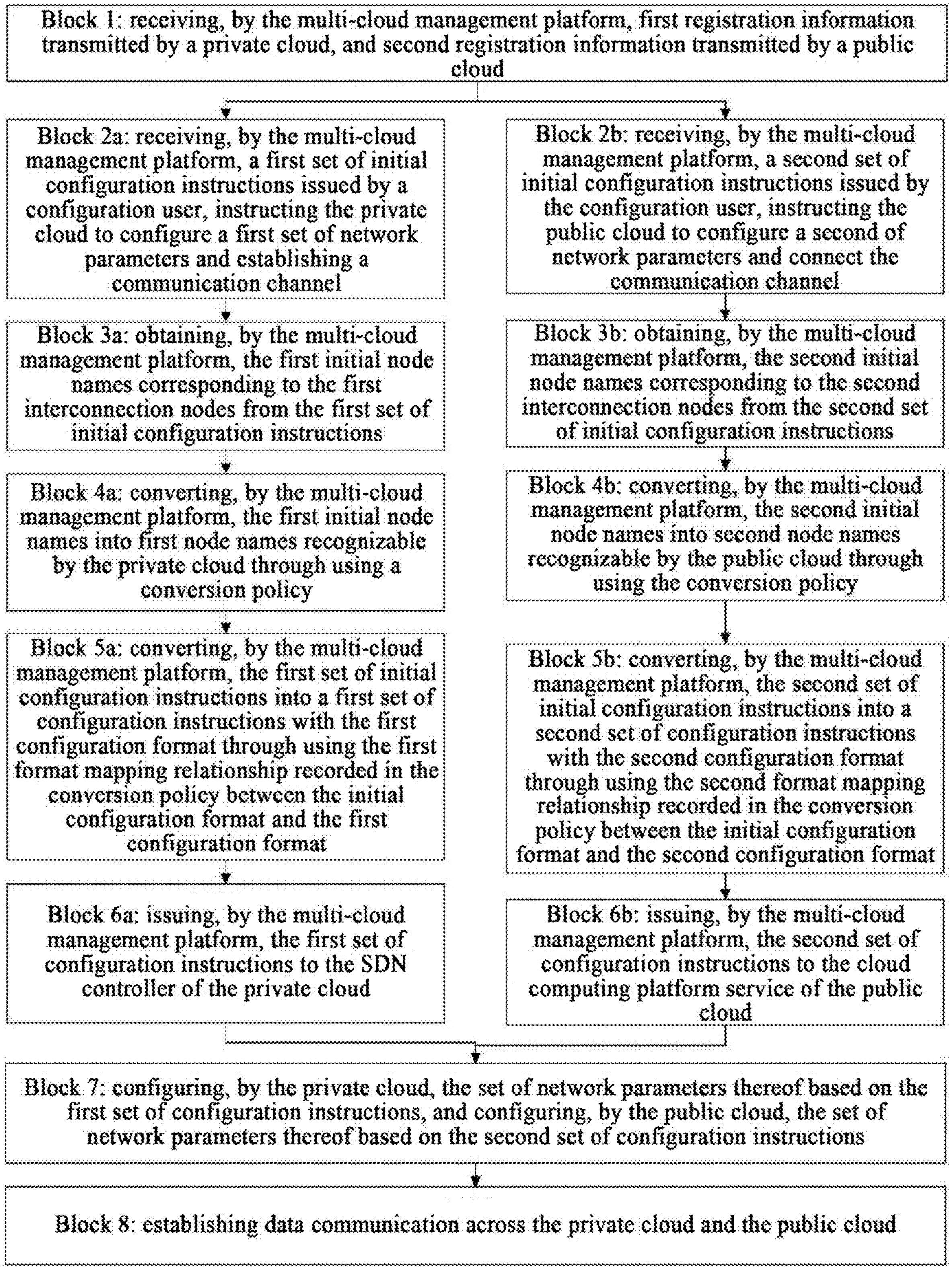
FIG. 5 is a schematic diagram of the overall flow of a method for communicating data across multi-cloud platforms proposed in this disclosure.

The alternative method, as illustrated in FIG. 5, presents a schematic diagram of the method for communicating data across multi-cloud platforms proposed in an example of this disclosure. The blocks involved are as follows:

Block 1: receiving, by the multi-cloud management platform, first registration information transmitted by a private cloud, and second registration information transmitted by a public cloud.

The first registration information includes the first configuration format supported by the private cloud and address information of the SDN controller, and the second registration information includes the second configuration format supported by the public cloud and credential information for the cloud computing platform service.

Block 2*a*: receiving, by the multi-cloud management platform, a first set of initial configuration instructions issued by a configuration user, instructing the private cloud to configure a first set of network parameters and establish a communication channel.

The first set of initial configuration instructions includes: address parameters and encryption policy parameters for the first intercommunication nodes, as well as subnet information and routing information indicating data packet flows among the first intercommunication nodes. The first intercommunication nodes are nodes in the private cloud which need to establish first data communication with the public cloud; and first set of channel parameters for instructing first channel nodes (such as firewalls, routers, or VPN gateways in the private cloud) to establish the communication channel.

Block 3*a*: obtaining, by the multi-cloud management platform, the first initial node names corresponding to the first interconnection nodes from the first set of initial configuration instructions.

wherein, the first intercommunication nodes are nodes in the private cloud which need to establish first data communication with the public cloud.

Block 4*a*: using a conversion policy, by the multi-cloud management platform, to convert the first initial node names into first node names recognizable by the private cloud.

Block 5*a*: using the first format mapping relationship recorded in the conversion policy between the initial configuration format and the first configuration format, by the multi-cloud management platform, to convert the first set of initial configuration instructions into a first set of configuration instructions with the first configuration format.

Block 6*a*: issuing, by the multi-cloud management platform, the first set of configuration instructions to the SDN controller of the private cloud, then proceeds to Block 7.

Block 2*b*: receiving, by the multi-cloud management platform, a second set of initial configuration instructions issued by the configuration user, instructing the public cloud to configure a second set of network parameters and connect the communication channel.

The second set of initial configuration instructions includes: subnet information and routing information indicating data packet flows among the second intercommunication nodes. The second intercommunication nodes are nodes in the public cloud which need to establish second data communication with the private cloud, and second set of channel parameters for instructing the public cloud to establish second channel nodes (such as IPsec VPN gateways).

Block 3*b*: obtaining, by the multi-cloud management platform, the second initial node names corresponding to the second interconnection nodes from the second set of initial configuration instructions.

wherein, the second intercommunication nodes are nodes in the public cloud which need to establish second data communication with the private cloud.

Block 4*b*: using the conversion policy, by the multi-cloud management platform to convert the second initial node names into second node names recognizable by the public cloud.

Block 5*b*: using the second format mapping relationship recorded in the conversion policy between the initial configuration format and the second configuration format, by the multi-cloud management platform, to convert the second set of initial configuration instructions into a second set of configuration instructions with the second configuration format.

Block 6*b*: issuing, by the multi-cloud management platform, the second set of configuration instructions to the cloud computing platform service of the public cloud, then proceeds to Block 7.

Block 7: configuring, by the private cloud, the first set of network parameters of the private cloud based on the first set of configuration instructions, and configuring, by the public cloud, the second set of network parameters of the public cloud based on the second set of configuration instructions.

Block 8: establishing a data communication across the private cloud and the public cloud.

By applying the technical solution of this disclosure, mapping relationships between the configuration formats of different cloud platforms and the initial configuration format used by business personnel may be pre-stored in the multi-cloud management platform. This allows business personnel to convert sets of configuration instructions in the initial configuration format, generated on the multi-cloud management platform for data intercommunication between multiple hybrid clouds, into sets of configuration instructions recognizable by respective cloud platforms based on these mapping relationships. Thus, the configuration task for communicating data across multi-cloud platforms may be completed.

The technical solution of this disclosure, on the one hand, enables a unified management of various private and public cloud platforms through a multi-cloud management platform, automating the network communication between private and public clouds. On the other hand, the technical solution also addresses the issue in related technologies where business personnel need to configure and manage private and public cloud platforms with manual operation to achieve hybrid cloud network intercommunication, which in turn affects business progress.

Figure 6:
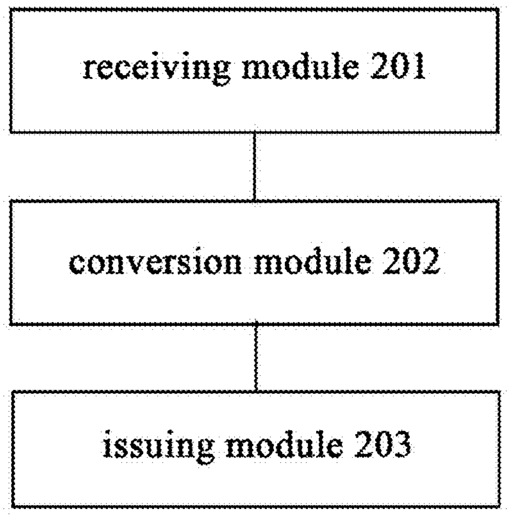
FIG. 6 is a structure schematic diagram of an electronic equipment proposed in this disclosure.

In some examples, in another example of this disclosure, as shown in FIG. 6, this disclosure also provides an equipment for communicating data across multi-cloud platforms, which is applied to a multi-cloud management platform, the multi-cloud management platform being connected to at least one private cloud and at least one public cloud, the equipment includes: a receiving module, to receive a first set of initial configuration instructions issued by a configuration user to the private cloud, and a second set of initial configuration instructions issued to the public cloud, wherein the first and second sets of initial configuration instructions are used to enable data communication between the private cloud and the public cloud, and the first and second sets of initial configuration instructions are arranged based on an initial configuration format supported by the multi-cloud management platform; a conversion module, to convert the first set of initial configuration instructions into a first set of configuration instructions with a first configuration format, and to convert the second set of initial configuration instructions into a second set of configuration instructions with a second configuration format by using a preset conversion policy, wherein the first configuration format is supported by the private cloud, and the second configuration format is supported by the public cloud; an issuing module, to issue the first set of configuration instructions to the private cloud, and to issue the second set of configuration instructions to the public cloud.

By applying the technical solution of this disclosure, mapping relationships between the configuration formats of different cloud platforms and the initial configuration format used by business personnel may be pre-stored in the multi-cloud management platform, so that in response to a determination that the business personnel generate sets of configuration instructions on the multi-cloud management platform for enabling data intercommunication across multiple hybrid clouds, they may convert sets of configuration instructions in the initial configuration format into sets of configuration instructions in the configuration format recognizable by respective cloud platforms based on the mapping relationships. This then completes the configuration task for communicating data across multi-cloud platforms. Thus, on the one hand, applying the technical solution enables a unified management of various private and public cloud platforms through a multi-cloud management platform, automating the bridging for the network communication between private and public clouds. On the other hand, applying the technical solution also addresses the issue in related technologies where business personnel need to configure and manage private and public cloud platforms with manual operation to achieve hybrid cloud network intercommunication, which affects business progress, as well as the drawback of slower storage system recovery time caused by this method.

In another example of this disclosure, the conversion module 202 is to: receive a first set of initial configuration instructions issued by the configuration user, which instructs the private cloud to configure a first set of network parameters and establish a communication channel, wherein the communication channel is an encrypted channel for data communication between the private cloud and the public cloud; wherein receiving the second set of initial configuration instructions issued by the configuration user to the public cloud includes: receiving a second set of initial configuration instructions issued by the configuration user, which instructs the public cloud to configure a second set of network parameters and connect to the communication channel.

In another example of this disclosure, the conversion module 202 is to: address parameters and encryption policy parameters of first intercommunication nodes, as well as subnet information and routing information for indicating data packet flows among the first intercommunication nodes, wherein the first intercommunication nodes are nodes in the private cloud that need to communicate data with the public cloud; and, first set of channel parameters for instructing first channel nodes to establish the communication channel, wherein the first channel node is a firewall, a router, or a VPN gateway in the private cloud.

In another example of this disclosure, the conversion module 202 is to: subnet information and routing information for indicating data packet flows among second intercommunication nodes, wherein the second intercommunication nodes are nodes in the public cloud that need to communicate data with the private cloud; and, second set of channel parameters for instructing the public cloud to establish a second channel node, wherein the second channel node is an IPsec VPN gateway with an encryption protocol.

In another example of this disclosure, the conversion module 202 is to: determine the first configuration format supported by the private cloud and the second configuration format supported by the public cloud based on registration information pre-transmitted across the private cloud and the public cloud; convert the first set of initial configuration instructions arranged in the initial configuration format into the first set of configuration instructions arranged in the first configuration format by using a first format mapping relationship recorded in the conversion policy between the initial configuration format and the first configuration format; and, convert the second set of initial configuration instructions arranged in the initial configuration format into the second set of configuration instructions arranged in the second configuration format by using a second format mapping relationship recorded in the conversion policy between the initial configuration format and the second configuration format.

In another example of this disclosure, the conversion module 202 is to: issue the first set of configuration instructions to the SDN controller of the private cloud; and, issue the second set of configuration instructions to the cloud computing platform service of the public cloud.

In another example of this disclosure, the conversion module 202 is to: receive first registration information transmitted by the private cloud, wherein the first registration information includes the first configuration format supported by the private cloud and address information of the SDN controller; and, receive second registration information transmitted by the public cloud, wherein the second registration information includes the second configuration format supported by the public cloud and credential information for the cloud computing platform service.

Figure 7:
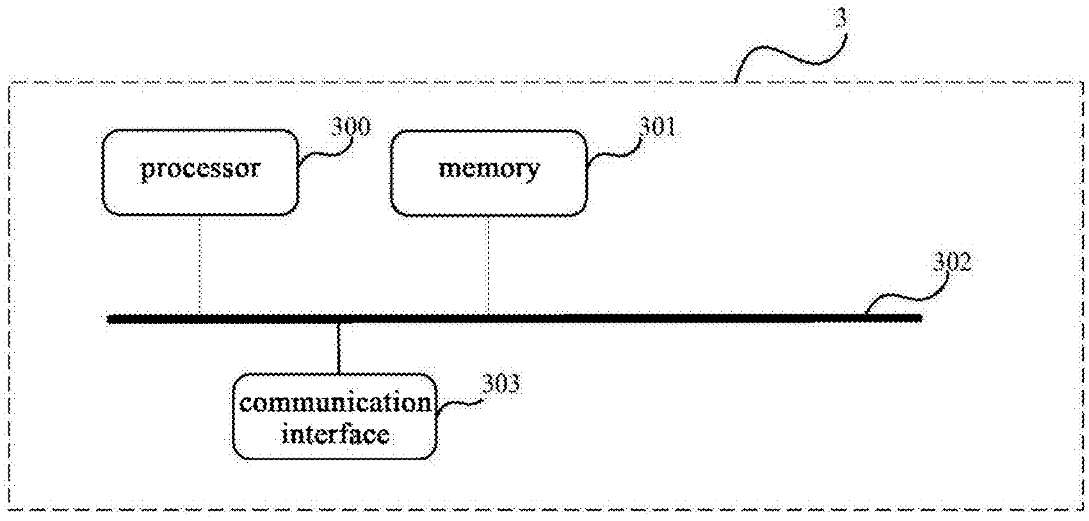
FIG. 7 is a structure schematic diagram of an electronic apparatus proposed in this disclosure.

The example of this disclosure also provides an electronic apparatus to execute the aforementioned method for communicating data across multi-cloud platforms. Please refer to FIG. 7, which illustrates a schematic diagram of an electronic apparatus provided by some examples of this disclosure. As shown in FIG. 7, electronic apparatus 3 includes: a processor 300, a memory 301, a bus 302, and a communication interface 303, where the processor 300, the communication interface 303, and the memory 301 are connected via the bus 302; the memory 301 stores computer programs that may run on the processor 300, and in response to a determination that the processor 300 runs these computer programs, the processor 300 executes the method for communicating data across multi-cloud platforms provided in any of the aforementioned examples of this disclosure.

Among them, the memory 301 may include high-speed Random Access Memory (RAM), and may also include non-volatile memory, such as at least one disk storage apparatus. Communication connections between this equipment's network element and one or more other network element is established through at least one communication interface 303 (which may be wired or wireless), and may utilize the Internet, Wide Area Networks (WANs), Local Area Networks (LANs), Metropolitan Area Networks (MANs), etc.

The bus 302 may be an ISA bus, a PCI bus, an EISA bus, etc. The bus may be divided into an address bus, a data bus, a control bus, etc. Among them, the memory 301 is used to store programs, and the processor 300 executes these programs upon receiving execution instructions. The aforementioned method for communicating data across multi-cloud platforms revealed in any example of this disclosure may be applied in or implemented by the processor 300.

The processor 300 may be an integrated circuit chip with signal processing capabilities. During implementation, the blocks of the aforementioned methods may be completed through integrated logic circuits in hardware within the processor 300 or through instructions in software form. The aforementioned processor 300 may be a general-purpose processor, including a Central Processing Unit (CPU), a Network Processor (NP), etc.; the processor 300 may also be a Digital Signal Processor (DSP), an Application-Specific Integrated Circuit (ASIC), a Field-Programmable Gate Array (FPGA), or other programmable logic apparatuses, discrete gate or transistor logic apparatuses, discrete hardware components. The processor 300 may implement or execute the various methods, processes, and logical block diagrams disclosed in the examples of this disclosure. A general-purpose processor may be a microprocessor or any conventional processor. The processes of the methods disclosed in the examples of this disclosure may be embodied as being executed by a hardware decoding processor or executed through a combination of hardware and software modules in a decoding processor. Software modules may be located in mature storage media in the field, such as Random Access Memory, flash memory, read-only memory, programmable read-only memory, or electrical-erasable programmable read-only memory, registers, etc. This storage medium is located in the memory 301, and the processor 300 reads information from the memory 301 and completes the processes of the aforementioned methods in conjunction with its hardware.

The electronic apparatus provided by the example of this disclosure is based on the same inventive concept as the method for communicating data across multi-cloud platforms provided by the example of this disclosure and has the same beneficial effects as the method which it adopts, runs, or implements.

It should be understood that this disclosure is not limited to the precise structures that have been described above and illustrated in the drawings, and various modifications and changes may be made without departing from its scope. The scope of this disclosure is limited only by the appended claims.

What is claimed is:

1. A method for communicating data across multi-cloud platforms, wherein, the method is applied to a multi-cloud management platform, which connects with one or more private clouds and one or more public clouds, and the method comprises:

receiving a first set of initial configuration instructions issued by a configuration user to the one or more private clouds;

receiving a second set of initial configuration instructions issued by the configuration user to the one or more public clouds;

wherein, the first set of initial configuration instructions and the second set of initial configuration instructions are to enable a first data communication across the one or more private clouds and the one or more public clouds, and are compiled based on an initial configuration format supported by the multi-cloud management platform;

converting the first set of initial configuration instructions into a first set of configuration instructions with a first configuration format, and the second set of initial configuration instructions into a second set of configuration instructions with a second configuration format based on a preset conversion policy; wherein the first configuration format is supported by the one or more private clouds and the second configuration format is supported by the one or more public clouds;

issuing the first set of configuration instructions to the one or more private clouds; and issuing the second set of configuration instructions to the one or more public clouds, wherein the receiving the first set of initial configuration instructions issued by the configuration user to the one or more private clouds comprises:

receiving the first set of initial configuration instructions issued by the configuration user, the first set of initial configuration instructions being to instruct the one or more private clouds to configure a first set of network parameters and establish a communication channel; wherein the communication channel is an encrypted channel for the first data communication across the one or more private clouds and the one or more public clouds, and wherein the receiving the second set of initial configuration instructions issued by the configuration user to the one or more public clouds comprises:

receiving the second set of initial configuration instructions issued by the configuration user, the second set of initial configuration instructions being to instruct the one or more public clouds to configure a second set of network parameters and connect to the communication channel, wherein prior to receiving the first set of initial configuration instructions issued by the configuration user and receiving the second set of initial configuration instructions issued by the configuration user, the method further comprises:

receiving first registration information transmitted by the one or more private clouds, wherein the first registration information comprises the first configuration format supported by the one or more private clouds and address information of a Software-Defined Network (SDN) controller; and receiving second registration information transmitted by the one or more public clouds, wherein the second registration information comprises the second configuration format supported by the one or more public clouds and credential information for a cloud computing platform service.

2. The method according to claim 1, wherein the first set of initial configuration instructions comprises:

address parameters and encryption policy parameters of first intercommunication nodes, and subnet information and routing information used for routing data packet flows among the first intercommunication nodes, wherein the first intercommunication nodes locate in the one or more private clouds and perform the first data communication with the one or more public clouds; and, a first set of channel parameters used for instructing a first channel node to establish the communication channel, wherein the first channel node is a firewall, a router, or a Virtual Private Network (VPN) gateway in the one or more private clouds, or, wherein the second set of initial configuration instructions comprises:

subnet information and routing information used for routing data packet flows among second intercommunication nodes, wherein the second intercommunication nodes locate in the one or more public clouds and perform a second data communication with the one or more private clouds; and, a second set of channel parameters used for instructing the one or more public clouds to establish a second channel node, wherein the second channel node is an encrypted protocol Internet Protocol Security Virtual Private Network, IPsec VPN, gateway.

3. The method according to claim 1, wherein the converting the first set of initial configuration instructions into the first set of configuration instructions with the first configuration format, and the second set of initial configuration instructions into the second set of configuration instructions with the second configuration format based on the preset conversion policy, comprises:

determining the first configuration format supported by the one or more private clouds and the second configuration format supported by the one or more public clouds based on a pre-transmitted registration information of the one or more private clouds and the one or more public clouds;

converting the first set of initial configuration instructions compiled in the initial configuration format into the first set of configuration instructions compiled in the first configuration format, based on using a first format mapping relationship recorded in the preset conversion policy between the initial configuration format and the first configuration format, and converting the second set of initial configuration instructions compiled in the initial configuration format into the second set of configuration instructions compiled in the second configuration format, based on a second format mapping relationship recorded in the preset conversion policy between the initial configuration format and the second configuration format.

4. The method according to claim 3, wherein the method further comprises:

obtaining first initial node names corresponding to first intercommunication nodes and comprised in the first set of initial configuration instructions; and obtaining second initial node names corresponding to second intercommunication nodes and comprised in the second set of initial configuration instructions; wherein the first intercommunication nodes locate in the one or more private clouds and perform the first data communication with the one or more public clouds, and the second intercommunication nodes locate in the one or more public clouds and perform a second data communication with the one or more private clouds;

converting the first initial node names into first node names recognizable for the one or more private clouds, and converting the second initial node names into second node names recognizable for the one or more public clouds, based on the preset conversion policy.

5. The method according to claim 1, wherein issuing the first set of configuration instructions to the one or more private clouds, and issuing the second set of configuration instructions to the one or more public clouds, comprises:

issuing the first set of configuration instructions to the SDN controller in the one or more private clouds; and issuing the second set of configuration instructions to the cloud computing platform service in the one or more public clouds.

6. An electronic apparatus, wherein the electronic apparatus comprises a processor and a memory;

the memory is to store a set of machine-executable instructions capable of being executed by the processor;

the processor is to execute the set of executable instructions stored on the memory to perform the method according to claim 1.

7. The electronic apparatus according to claim 6, wherein the first set of initial configuration instructions comprises:

address parameters and encryption policy parameters of first intercommunication nodes, and subnet information and routing information used for routing data packet flows among the first intercommunication nodes, wherein the first intercommunication nodes locate in the one or more private clouds and perform the first data communication with the one or more public clouds; and, a first set of channel parameters used for instructing a first channel node to establish the communication channel, wherein the first channel node is a firewall, a router, or a Virtual Private Network (VPN) gateway in the one or more private clouds, or, wherein the second set of initial configuration instructions comprises:

subnet information and routing information used for routing data packet flows among second intercommunication nodes, wherein the second intercommunication nodes locate in the one or more public clouds and perform a second data communication with the one or more private clouds; and, a second set of channel parameters used for instructing the one or more public clouds to establish a second channel node, wherein the second channel node is an encrypted protocol Internet Protocol Security Virtual Private Network, IPsec VPN, gateway.

8. The electronic apparatus according to claim 6, wherein the converting the first set of initial configuration instructions into the first set of configuration instructions with the first configuration format, and the second set of initial configuration instructions into the second set of configuration instructions with the second configuration format based on the preset conversion policy, comprises:

determining the first configuration format supported by the one or more private clouds and the second configuration format supported by the one or more public clouds based on a pre-transmitted registration information of the one or more private clouds and the one or more public clouds;

converting the first set of initial configuration instructions compiled in the initial configuration format into the first set of configuration instructions compiled in the first configuration format, based on using a first format mapping relationship recorded in the preset conversion policy between the initial configuration format and the first configuration format, and converting the second set of initial configuration instructions compiled in the initial configuration format into the second set of configuration instructions compiled in the second configuration format, based on a second format mapping relationship recorded in the preset conversion policy between the initial configuration format and the second configuration format.

9. The electronic apparatus according to claim 8, wherein the processor is to execute the set of executable instructions stored on the memory to further perform:

obtaining first initial node names corresponding to first intercommunication nodes and comprised in the first set of initial configuration instructions; and obtaining second initial node names corresponding to second intercommunication nodes and comprised in the second set of initial configuration instructions; wherein the first intercommunication nodes locate in the one or more private clouds and perform the first data communication with the one or more public clouds, and the second intercommunication nodes locate in the one or more public clouds and perform a second data communication with the one or more private clouds;

converting the first initial node names into first node names recognizable for the one or more private clouds, and converting the second initial node names into second node names recognizable for the one or more public clouds, based on the preset conversion policy.

10. The electronic apparatus according to claim 6, wherein issuing the first set of configuration instructions to the one or more private clouds, and issuing the second set of configuration instructions to the one or more public clouds, comprises:

issuing the first set of configuration instructions to a Software-Defined Network (SDN) controller in the one or more private clouds; and issuing the second set of configuration instructions to a cloud computing platform service in the one or more public clouds.

11. A non-transitory computer-readable storage medium, wherein the computer-readable storage medium stores a set of computer-readable instructions, which in response to being executed by a processor, performs the method according to claim 1.

12. The non-transitory computer-readable storage medium according to claim 11, wherein the converting the first set of initial configuration instructions into the first set of configuration instructions with the first configuration format, and the second set of initial configuration instructions into the second set of configuration instructions with the second configuration format based on the preset conversion policy, comprises:

determining the first configuration format supported by the one or more private clouds and the second configuration format supported by the one or more public clouds based on a pre-transmitted registration information of the one or more private clouds and the one or more public clouds;

converting the first set of initial configuration instructions compiled in the initial configuration format into the first set of configuration instructions compiled in the first configuration format, based on using a first format mapping relationship recorded in the preset conversion policy between the initial configuration format and the first configuration format; and converting the second set of initial configuration instructions compiled in the initial configuration format into the second set of configuration instructions compiled in the second configuration format, based on a second format mapping relationship recorded in the preset conversion policy between the initial configuration format and the second configuration format.

13. The non-transitory computer-readable storage medium according to claim 12, wherein the set of computer-readable instructions, which in response to being executed by a processor, further performs:

obtaining first initial node names corresponding to first intercommunication nodes and comprised in the first set of initial configuration instructions; and obtaining second initial node names corresponding to second intercommunication nodes and comprised in the second set of initial configuration instructions; wherein the first intercommunication nodes locate in the one or more private clouds and perform the first data communication with the one or more public clouds, and the second intercommunication nodes locate in the one or more public clouds and perform a second data communication with the one or more private clouds;

converting the first initial node names into first node names recognizable for the one or more private clouds, and converting the second initial node names into second node names recognizable for the one or more public clouds, based on the preset conversion policy.

14. The non-transitory computer-readable storage medium according to claim 11, wherein issuing the first set of configuration instructions to the one or more private clouds, and issuing the second set of configuration instructions to the one or more public clouds, comprises:

issuing the first set of configuration instructions to a Software-Defined Network (SDN) controller in the one or more private clouds; and issuing the second set of configuration instructions to a cloud computing platform service in the one or more public clouds.

* * * * *